Feb. 4, 1958  F. S. RUDOLPH  2,821,960
AUTOMATIC TAKE-UP HORSE TRAINING DEVICE
Filed March 2, 1955

INVENTOR
FAUCETTE S. RUDOLPH
BY *Leech & Radue*
ATTORNEYS

2,821,960
AUTOMATIC TAKE-UP HORSE TRAINING DEVICE

Faucette S. Rudolph, Torrance, Calif.

Application March 2, 1955, Serial No. 491,737

6 Claims. (Cl. 119—29)

This invention relates to horse training equipment and more particularly to apparatus adapted to be used to teach the horse to maintain a taut rope when engaged in throwing and tying operations.

In the throwing and tying of a calf it is necessary that the horse keep working the rope, i. e., the slack must be kept out of the rope. Even the best trained horses at times will allow some slack to develop in the rope and it therefore appeared desirable that some means be devised for use initially as a training device and later as part of the regular equipment to cause the horse to maintain a tight rope.

In view of the above it is one object of this invention to provide a horse training device which will teach the horse to maintain a taut rope during roping exercises.

It is another object to provide a device such as the above which will in no way harm the animal when it is used.

It is yet another object to provide such a device which will be simple to use and economical to manufacture.

The above and other objects will appear more clearly from the following detailed description when taken in connection with the accompanying drawing showing a preferred embodiment and wherein.

Figure 1:
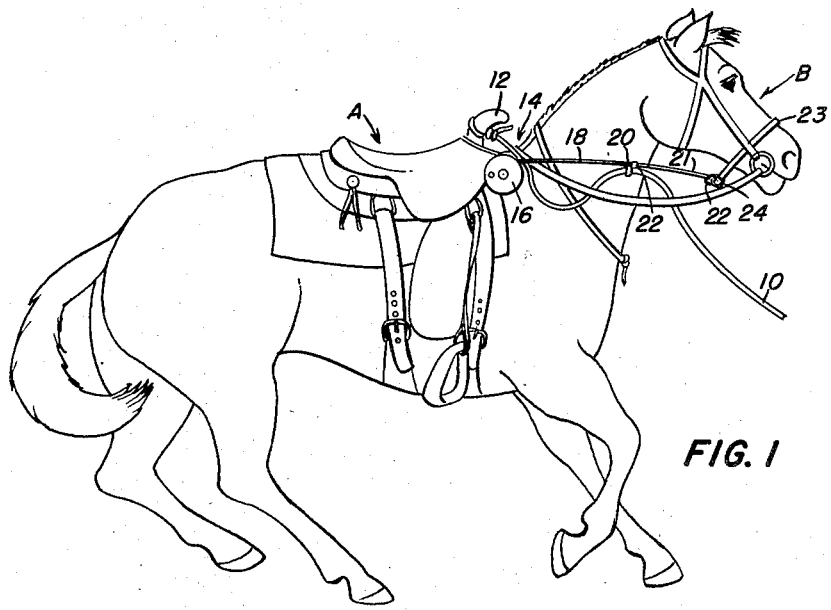
Fig. 1 is a side view showing a horse equipped with the usual saddle and bridle and the manner in which the training apparatus is associated therewith.

As shown in Fig. 1 the horse is equipped with the usual saddle A and bridle equipment B. The rope 10 is secured to the saddle horn 12 so as to make it possible for the horse to back up and maintain a tight rope during roping operations.

The training device 14 comprises a spring biased reel assembly 16 carrying a cable 18 having a free end adapted to be attached to rope 10 by a clamp member 20 in a manner to be later described. A strap member 21 having snap fasteners 22 on both ends thereof connects the clamp 20 and nose band 23, one of the snap fasteners being secured to the clamp 20 and the other to ring 24 on the nose band.

Figure 2:
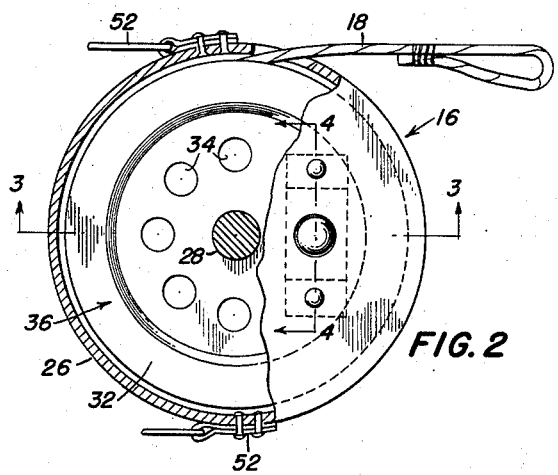
Fig. 2 is an enlarged top plan view partly in section showing some of the details of the spring biased reel.
Figure 4:
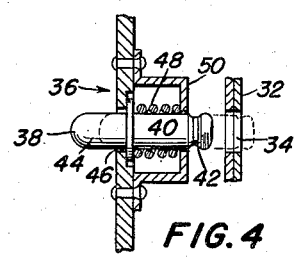
Fig. 4 is a fragmentary sectional view taken along line 4—4 of Fig. 2 and shows the manner in which the reel trigger mechanism operates.
Figure 3:
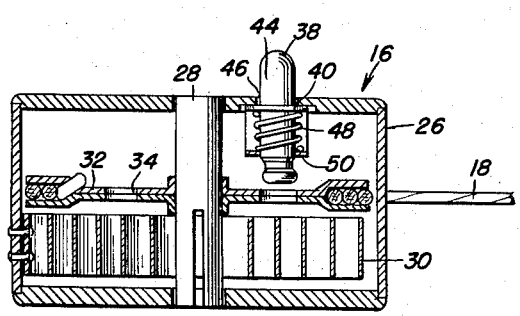
Fig. 3 is a cross-sectional view taken along line 3—3 of Fig. 2 showing the details of the reel.

Referring to Figs. 2, 3 and 4, the spring biased reel assembly 16 comprises a housing 26 having a shaft 28 extending centrally and vertically therethrough. The lower portion of the shaft 28 is slotted to receive the inner end of a coil spring 30 while the outer end of the spring is suitably fastened to the housing. A pulley 32 having a plurality of holes 34 in its web is secured to the shaft 28 just above the spring 30. The cable 18 has several turns wound on the pulley as best shown in Fig. 3.

The holes 34 in the pulley are adapted to cooperate with trigger mechanism 36 to hold the cable in inoperative or non-tensioned condition until released by the trigger. The trigger mechanism is mounted in the upper portion of the housing and comprises a plunger 38 having a flange 40 intermediate its ends and a grooved portion 42 adjacent its lower end. The upper portion 44 of the plunger extends through a hole 46 in the housing and a helical spring 48 suitably supported by bracket 50 and pressing against the underside of flange 40 acts to maintain the plunger in fully extended position as shown in the solid lines in Fig. 4. In order to set the trigger mechanism the plunger is pushed downward through a hole in the pulley as indicated in the dotted lines in Fig. 4 so that the grooved portion 42 will engage the edge surrounding the pulley hole 34 and the spring tension on the pulley will hold the plunger in such position to prevent rotation of the pulley. With the plunger in the depressed position a slight pull on cable 18 will impart a small amount of rotation to the pulley and thereby release the plunger allowing it to move upwardly thus freeing the pulley therefrom.

The reel housing 26 has loop members 52 fastened to the wall thereof. The reel is mounted on the saddle by means of a strap or other suitable means which is adapted to be connected to one or both of these loops.

In assembling and using the apparatus, the strap 21 is secured to the nose band 23 and clamp 20 by means of snap fasteners 22 on the ends of the strap. The clamp 20 is positioned on rope 10 at such a distance from the horn 12 that a small amount of slack will exist in the rope between the clamp and the horn when strap 21 is connected to the clamp and the nose band. The reel assembly 16 is next secured to the saddle as previously described and the free end of the cable 18 is pulled out from the reel until enough has been exposed to reach the clamp 20 when the strap 21 is attached thereto and extended in position as shown in Fig. 1. This tensions the spring 30 and the plunger 38 is then pushed downward so that its grooved portion 42 may engage the periphery of a pulley hole 34 which is aligned therewith to maintain this portion of cable in such position without tension on it. After this the free end of the cable is fastened to the clamp 20. The apparatus is now in position for use and it should be noted that in the ready or set position the cable 18 and strap 21 form a direct connection between the reel and the nose band. In this position there is a little slack in rope 10 between clamp 20 and saddle horn 12.

When a calf is roped and the horse stops, the rope will become taut by the action of the calf and thereby impart a slight rotation to pulley 32, thus freeing it from plunger 38. The pulley and the rope connected thereto are now under the pull of spring 30 and as long as the horse keeps the rope taut there will be no pressure brought on the nose band. However, should the rope become slack the spring will exert a pull on cable 18 and on nose band 23 which is connected to the cable by strap 21 thereby causing the horse to back up and again take out the slack in the rope.

In view of the above it is apparent that this device may be carried on the horse and set for action at all times and as long as the rope is not being used the device will be held in a non-tension position so as not to bother the horse.

Although only one embodiment of this invention has been illustrated and described it is apparent that many changes may be made thereto within the scope of this invention.

What I claim as novel and desire to secure by Letters Patent of the United States is:

1. Training apparatus for use on a horse equipped with a saddle, a rope and conventional bridle and particularly adapted for training horses to maintain a taut rope during the throwing and tying of a calf wherein one end of the rope is secured to the saddle horn, said apparatus comprising a nose band adapted to fit down over the horse's nose, a spring secured to the saddle, means connecting the spring and the nose band, and fastening means securing the connecting means to the rope so that a slackness in the rope will allow the spring to exert a pull on the connecting means and thence on the nose band to cause the horse to back up thereby tightening up on the rope.

2. Training apparatus for use on a horse equipped with a saddle, a rope and conventional bridle, and particularly adapted for training horses to maintain a taut rope during the throwing and tying of a calf wherein one end of the rope is secured to the saddle horn, said apparatus comprising a nose band adapted to fit down over the horse's nose, a reel attached to the saddle and having a spring biased pulley, means connecting the nose band to the reel and fastening means securing said connecting means to the rope so that a slackness in the rope will allow the spring in the reel to exert a pull on the cable and thence on the nose band to cause the horse to back up thereby tightening up on the rope.

3. The device as described in claim 2 wherein the means connecting the nose band to the reel comprises a cable connecting the reel to the fastening means and a strap connecting the fastening means to the nose band.

4. The device as described in claim 3 wherein the spring biased reel has a pulley locking trigger for relieving the cable of spring tension when the apparatus is not in use.

5. The device as described in claim 4 wherein the trigger is released upon the initial tightening of the rope in the roping operation so as to allow the spring to exert tension on the cable thereafter.

6. A training apparatus for a horse comprising a mounting means for attachment to the saddle of a horse, a lariat having one end attached to said mounting means and a free end for engaging an animal, a housing attached to said mounting means and having therein a spring-tensioned reeling means, a flexible element about said reel and having an outwardly extending end having means for attachment to a control piece of a horse, means interconnecting intermediate portions of said flexible means and said lariat, and releasable locking means between said housing and said reeling means, whereby when tension is placed on said lariat by the horse the locking means will be released, and releasing of the tension on the lariat by the horse will cause winding up of the flexible member to exert tension on the control piece to effect backing of the horse and restoring tension on the lariat.

References Cited in the file of this patent
UNITED STATES PATENTS

| | | |
|---|---|---|
| 1,153,188 | Block | Sept. 14, 1915 |
| 2,314,504 | Lifchultz | Mar. 23, 1943 |